(12) United States Patent
Abe et al.

(10) Patent No.: US 7,581,291 B2
(45) Date of Patent: Sep. 1, 2009

(54) HINGE DEVICE

(75) Inventors: Kenji Abe, Yokohama (JP); Tomoaki Nakamura, Yokohama (JP); Masahiko Yamanami, Tokyo (JP)

(73) Assignee: Kabushiki Kaisha Strawberry Corporation, Tokyo (JP)

( * ) Notice: Subject to any disclaimer, the term of this patent is extended or adjusted under 35 U.S.C. 154(b) by 244 days.

(21) Appl. No.: 10/548,278

(22) PCT Filed: Mar. 5, 2004

(86) PCT No.: PCT/JP2004/002857

§ 371 (c)(1),
(2), (4) Date: Jun. 22, 2006

(87) PCT Pub. No.: WO2004/081398

PCT Pub. Date: Sep. 23, 2004

(65) Prior Publication Data

US 2007/0271733 A1 Nov. 29, 2007

(30) Foreign Application Priority Data

Mar. 10, 2003 (JP) ............................. 2003-064249

(51) Int. Cl.
*E05D 3/10* (2006.01)
(52) U.S. Cl. .............................. 16/367; 16/366; 16/371; 16/302
(58) Field of Classification Search .............. 16/366, 16/367, 371, 302, 297, 303, 330, 337, 338, 16/340, 341, 363; 455/575.3; 379/433.11, 379/433.12, 433.13; 361/680, 681, 682, 361/683, 679.06, 679.07, 679.11, 679.12, 361/679.15, 679.16, 679.2, 679.27, 679.28
See application file for complete search history.

(56) References Cited

U.S. PATENT DOCUMENTS

| 6,587,333 | B2 * | 7/2003 | Tseng et al. | ................. 361/681 |
| 6,867,961 | B2 * | 3/2005 | Choi | ........................... 361/681 |
| 6,948,217 | B2 * | 9/2005 | Higano et al. | .................. 16/303 |
| 7,146,195 | B2 * | 12/2006 | Sudo et al. | ............... 455/575.1 |
| 7,239,897 | B2 * | 7/2007 | Ozaki | ........................ 455/575.1 |
| 2002/0061770 | A1 | 5/2002 | Ozaki | |
| 2003/0064758 | A1 * | 4/2003 | Mizuta et al. | ................ 455/566 |
| 2004/0083577 | A1 * | 5/2004 | Lu et al. | ........................ 16/367 |

FOREIGN PATENT DOCUMENTS

| EP | 1207671 A2 | 5/2002 |
| JP | 2000-196720 | 7/2000 |
| JP | 2002-158758 | 3/2002 |
| JP | 2002-155923 | 5/2002 |
| JP | 2004-084929 | 3/2004 |

* cited by examiner

*Primary Examiner*—Victor Batson
*Assistant Examiner*—Jeffrey O'Brien
(74) *Attorney, Agent, or Firm*—Connolly Bove Lodge & Hutz LLP

(57) ABSTRACT

A compact hinge device is provided with which it is possible to turn two members and it is possible to make one of the members incline with respect to the other member. By a turning shaft part turning in a through hole in a first base member, a second base member constructed to turn together with the turning shaft part can be turned, and by an abutting part provided on the second base member sliding on a cam surface provided on the first base member the second base member can be made to incline with respect to the turning shaft part.

19 Claims, 5 Drawing Sheets

HINGE DEVICE

TECHNICAL FIELD

This invention relates to a hinge device for joining one member to another member, and particularly relates to a hinge device with which it is possible to dispose one member and another member face-to-face, it is possible to turn the one member with respect to the other member about an axis along the direction in which the members overlap, and it is possible to make the one member incline with respect to the other member along with this turning.

BACKGROUND ART

Until now, as hinge devices for connecting two members pivotally and bringing the two members from a closed state in which they are face-to-face to an open state in which their facing faces are spread like an open book, ones having various different constructions have been in use, and for example their use in electrical appliances has been proposed.

However, among hinge devices for performing an opening and closing movement of the kind described above the majority are single-axis ones, and in the case of constructions that bring both facing faces to an open state in which they are spread like an open book and for example as the closed state the two members can be brought face-to-face and the opening movement can be performed with the upper faces of the members facing in substantially the same direction throughout and the upper face of one of the members can be made to incline with respect to the upper face of the other member, it is necessary to adopt a 2-axis construction, but there was the problem that in ones of a 2-axis construction the joining device tends to become bulky as set forth in Patent Document 1. Furthermore, there was also the problem that a special structure for making it possible to incline the upper face of one of the members with respect to the upper face of the other member was necessary.

Patent Document 1

U.S. Pat. No. 3,189,818 which is also cited as JP 2000196720.

DISCLOSURE OF THE INVENTION

An object of the invention is in providing a compact hinge device with which it is possible to turn two members and it is possible to make one of the members incline with respect to the other member.

Accordingly, in view of the problems mentioned above, the invention provides, in a hinge device for hinging a first member and a second member so that from a face-to-face state the second member can be turned substantially in parallel with its blocked face brought face-to-face with the first member to expose the blocked face, a hinge device characterized in that it includes a first base member fixed to the first member and having a first through hole, a second base member fixed to the second member and having a second through hole, and a turning shaft part engaging with the first and second through holes, and is constructed so that by the second base member turning with respect to the first base member the turning shaft part can turn with respect to the through holes, the turning shaft part is provided in such a state that it is prevented from turning with respect to the second base member and is constructed so that along with turning of the second base member it turns together with that second base member, the second base member is constructed to be free to incline relative to the turning shaft part about a direction substantially orthogonal to the turning axis of the turning shaft part as a swinging axis, an abutting part is provided on the second base member side and a cam surface for abutting with the abutting member is provided on the first base member side, an elastic body is disposed with one end fixed to the turning shaft part and the other end pushing the second base member so as to press the abutting part against the cam surface, and when the second base member turns, the second base member is made to incline relative to the turning shaft part by the abutting part sliding on the cam surface.

With this invention, by the turning shaft part turning in the through hole of the first base member, the second base member constructed so as to turn together with the turning shaft part can be made to turn, and by the abutting part provided on the second base member sliding on the cam surface provided on the first base member, the second base member can be made to incline with respect to the turning shaft part.

And in a hinge device according to the invention, preferably, at a start point of the cam surface provided on the first base member there is provided a drop-in recess for the abutting part to drop into and allow the second base member to incline, and by the elastic body urging the abutting part to drop into the drop-in recess the second base member is urged to incline.

By this means, because the abutting part provided on the second base member is urged to drop into the drop-in recess provided on the first base member, the second base member can be prevented from turning easily with respect to the first base member.

And in a hinge device according to the invention, preferably the cam surface is made a continuous sloping surface whose height increases from its start point toward its end point.

By this means, when the second base member turns with respect to the first base member, the second base member can be made to incline gradually with respect to the turning shaft part.

And in a hinge device according to the invention, preferably there is provided a positioning/retaining mechanism for positioning and retaining the turning of the turning shaft part in a predetermined position, and the second member is positioned/retained at least in a position wherein it overlaps so as to cover the first member and a position wherein from the overlapping state the second member has been turned through approximately 180° with respect to the first member and is in a state connected to the first member in an approximate straight line.

By this means, in a face-to-face state and a state turned through about 180° from the face-to-face state, the second base member can be prevented from turning through more than a certain fixed angle with respect to the first base member.

As described above, with this invention it is possible to provide a compact hinge device with which two members can be turned and one member can be inclined with respect to the other member.

BEST MODES FOR CARRYING OUT THE INVENTION

An embodiment of the invention will be described below.

Figure 1:
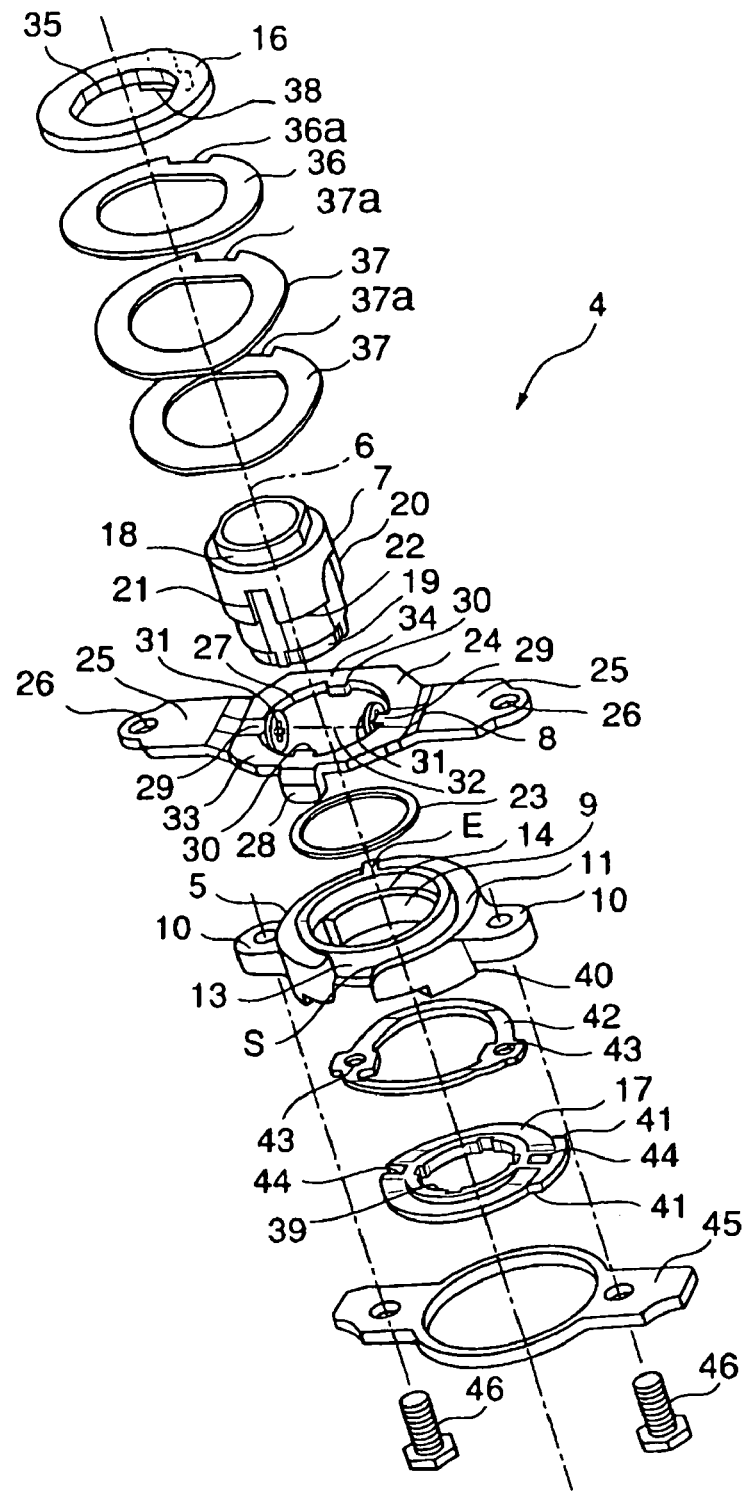
FIG. 1 is an exploded perspective view showing a hinge device of the invention.
Figure 2:
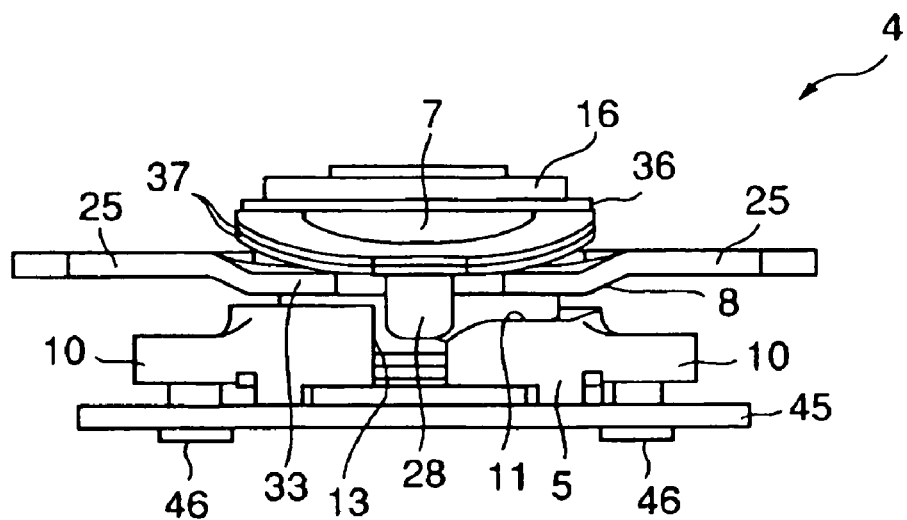
FIG. 2 is a front view showing the hinge device of FIG. 1.
Figure 3:
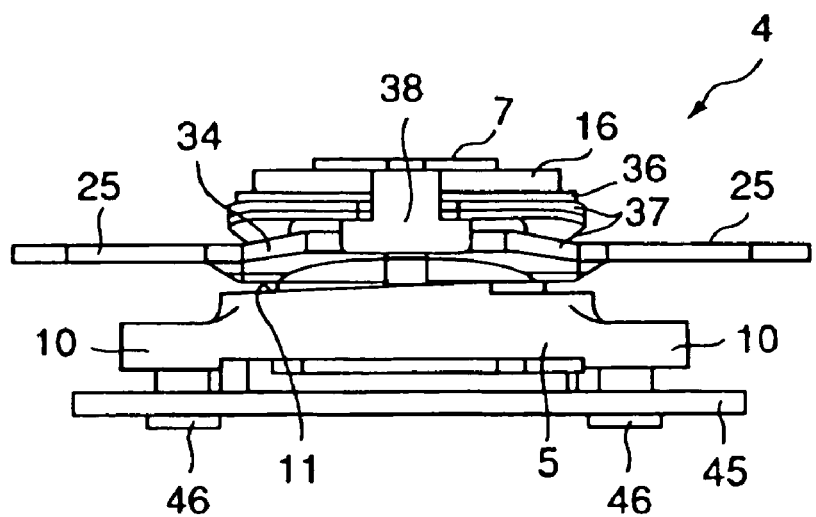
FIG. 3 is a rear view showing the hinge device of FIG. 1.
Figure 4:
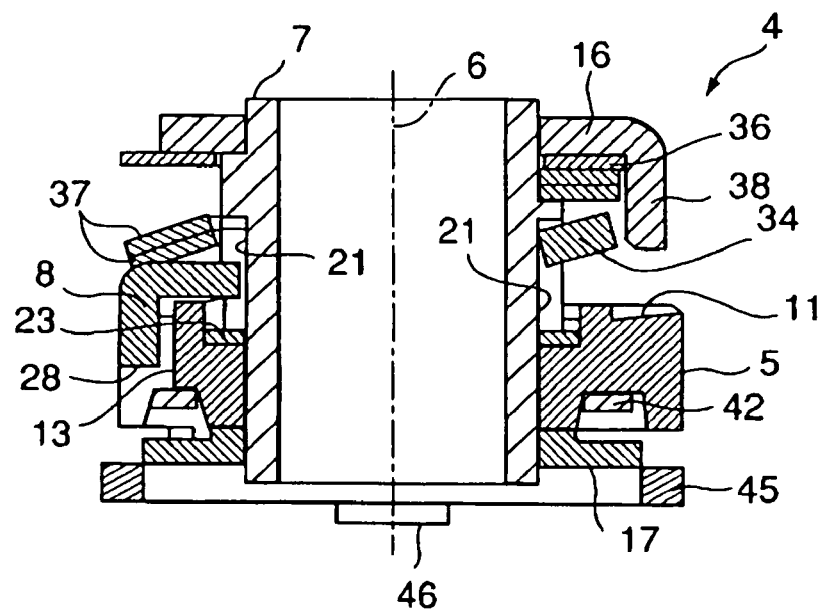
FIG. 4 is a sectional view showing a first state of the hinge device of FIG. 1.
Figure 5:
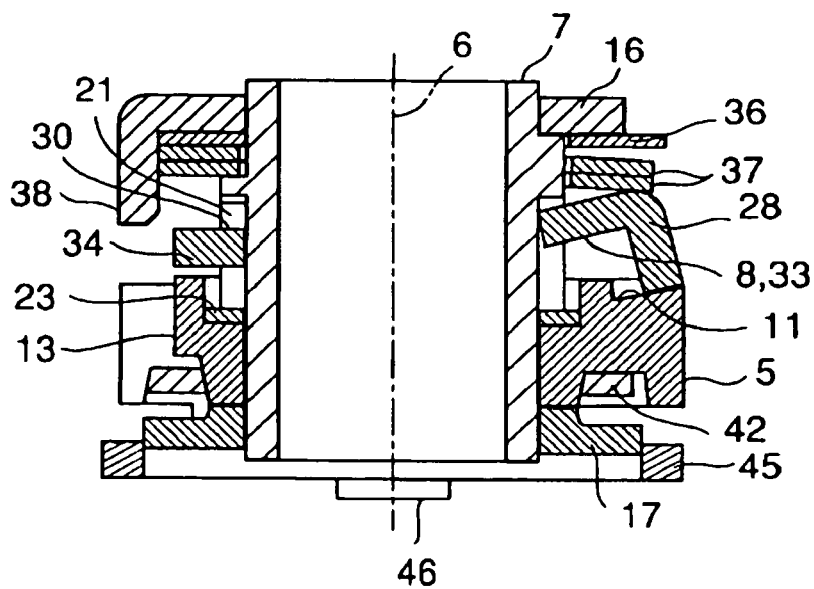
FIG. 5 is a sectional view showing a second state of the hinge device of FIG. 1.

FIG. 1 is an exploded perspective view showing a hinge device of the invention. FIG. 2 is a front view of the hinge device of FIG. 1, FIG. 3 is a rear view showing the hinge device of FIG. 1, FIG. 4 is a sectional view showing a first state of the hinge device of FIG. 1, FIG. 5 is a sectional view showing a second state of the hinge device of FIG. 1, FIG. 6 is a side view showing two members joined using the hinge device of FIG. 1 in a closed state wherein the two members are face-to-face, and FIG. 7 is a side view showing two members joined using the hinge device of FIG. 1 in an open state wherein one of the members has been turned through 180° with respect to the other member from the face-to-face state.

Figure 6:
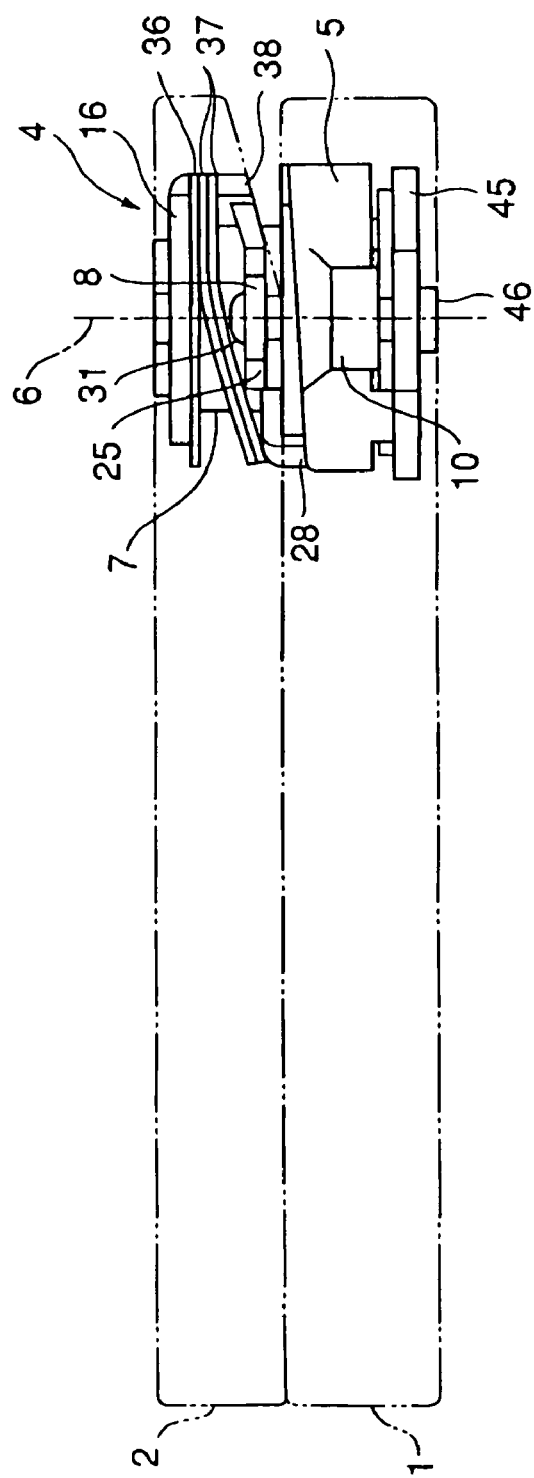
FIG. 6 is a side view of two members joined using the hinge device of FIG. 1, showing the two members brought face-to-face.
Figure 7:
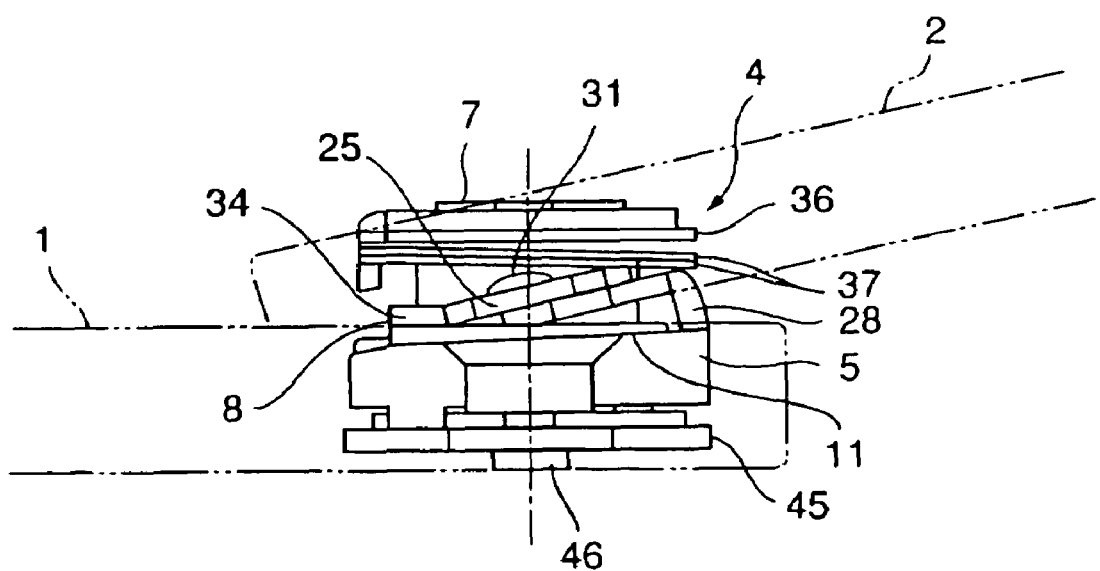
FIG. 7 is a side view of two members joined using the hinge device of FIG. 1, showing one of the members turned through 180° from the face-to-face state with respect to the other member.

Referring to FIG. 6, using a hinge device 4 according to this invention it is possible to join together two members (a first member 1 and a second member 2). A hinge device according to the invention will now be described with reference from FIG. 1 to FIG. 5.

The hinge device of the invention has a first base member 5 having a through hole 9, a turning shaft part 7 fitted to the first base member 5 rotatably about an axis 6 extending in the thickness direction of this first base member 5, and a second base member 8 attached to the turning shaft part 7 inclinably with respect thereto.

The first base member 5 has the through hole 9 in its center and has at its periphery a pair of fixing flanges 10 extending in the radial direction. It has a cam surface 11 extending through approximately 180° around the through hole 9, at a start point S of this cam surface 11 it has a drop-in recess 13 cut away in the thickness direction, and the cam surface 11 is a continuous sloping surface whose height gradually increases from the start point S toward an end point E. By this means, the cam surface 11 is formed so as to gradually descend in the circumferential direction from a highest, end point position and drop in toward the cut-away recess 13. A step part 14 for receiving the turning shaft part 7 is formed on the inner wall face of the through hole 9.

The turning shaft part 7 is formed in an approximately cylindrical shape and is fitted in the through hole 9 of the first base member 5 and attached rotatably about the axis 6.

And, at the ends of the turning shaft part 7, fixing parts 18, 19 for respectively fixing a spring-bearing member 16 and a stopper 17, which will be further discussed later, are provided, in the outer circumferential face of the turning shaft part 7 two pairs of grooves 20, 21 are provided in positions which face to each other on opposite sides of the axis 6, and these grooves 20, 21 are formed in the length direction of the turning shaft part 7 to a part-way position thereof. The ends of the one pair of grooves 20 are formed in a semi-circular shape.

Also, in the central vicinity of the length direction of the turning shaft part 7, a step part 22 at which the external diameter dimension becomes smaller by a step toward the end that is inserted into the through hole 9 of the first base member 5 is formed. By this step part 22 of the turning shaft part 7 being caught by the step part 14 in the through hole 9 of the first base member 5, the turning shaft part 7 is retained in position with respect to the first base member 5 in the axis 6 direction.

In the figures, the reference number 23 is a washer sandwiched between the step part 22 of the turning shaft part 7 and the step part 14 of the first base member 5, so as to reduce friction caused by direct contact between the step parts 14, 22 and make smooth the turning of the turning shaft part 7 with respect to the first base member 5.

The second base member 8 is formed, for example by pressing a flat metal sheet, into a shape having integrally a ring-plate-shaped slider part 24 disposed in the middle and two bracket parts 25 projecting radially outward from this slider part 24. Mounting holes 26 for fixing the second base member 8 are provided in the bracket parts 25.

In the center of the slider part 24 a through hole 27 for the turning shaft part 7 to be passed through is formed, and at the periphery of the slider part 24 an abutting part 28 projecting in the plate thickness direction is formed by a part of the flat plate constituting the slider part 24 being bent over through about 90°. This abutting part 28 is disposed in a radial direction position equal to the radial dimension of the cam surface 11 of the first base member 5 with respect to the center of the through hole 27.

In the through hole 27 of the second base member 8, four projections 29, 30 spaced at 90° in the circumferential direction and projecting radially inward are provided. And disc-shaped pivot shaft plates 31 are attached to the pair of opposing projections 29. These pivot shaft plates 31 are formed so as to have a radial dimension equal to the radial dimension of the semi-circular end parts of the grooves 20 formed in the outer face of the turning shaft part 7, and when the turning shaft part 7 is inserted into the through hole 27 these pivot shaft plates 31 are inserted into the respective grooves 20 of the turning shaft part 7 and engage therewith.

When the pivot shaft plates 31 hit the end parts of the semi-circular grooves 20, their outer circumferential faces are slidably supported by the semi-circular side walls of the end parts of the grooves 20. By this means, the second base member 8 is supported by the turning shaft part 7 swingably about the common centerline 32 of the two pivot shaft plates 31, which is perpendicular to the axis 6 of the turning shaft part 7.

When the turning shaft part 7 is inserted into the through hole 27, the other pair of projections 30 provided in the through hole 27 of the second base member 8 are inserted into the grooves 21 of the turning shaft part 7, and they can move inside the grooves 21 when the second base member 8 swings with respect to the turning shaft part 7.

By the pivot shaft plates 31 and the projections 30 of the second base member 8 being disposed in an inserted state in the grooves 20, 21 provided in the length direction in the outer face of the turning shaft part 7, the pivot shaft plates 31 and the projections 30 are made to engage with the side walls of the grooves 20, 21 in the circumferential direction of the turning shaft part 7. Consequently, when a turning force about the axis 6 of the turning shaft part 7 is applied to the second base member 8, that turning force is transmitted to the turning shaft part 7 via the engagement of the pivot shaft plates 31 and the projections 30 of the second base member 8 with the grooves 20, 21 into which these have been inserted, and the turning shaft part 7 can be made to turn about the axis 6.

And, the slider part 24 of the second base member 8 has a parallel part 33 approximately parallel with the bracket parts 25 and a sloping part 34 sloping with respect to the parallel part 33 about the common centerline 32 of the two pivot shaft plates 31, and these are disposed on opposite sides of the common centerline 32. The abutting part 28 is formed on the parallel part 33, and is constructed so that the end of the abutting part 28 is roughly disposed on a flat plane including the rear face of the sloping part 34.

The spring-bearing member 16 has a mating hole 35 having a shape complementary to the shape of the fixing part 18 provided on one end of the turning shaft part 7. By the fixing part 18 being mated with the mating hole 35 and the fixing part 18 then being caulked, the spring-bearing member 16 is fixed integrally to the turning shaft part 7. The spring-bearing member 16 has a support projection 38 for attaching a spacer 36 and two bending springs 37 mated with the turning shaft part 7 so that they do not turn with respect to the turning shaft part 7, and this support projection 38 is formed in a T shape and engages with cutaways 36a, 37a respectively provided in the spacer 36 and the bending springs 37.

The spring-bearing member 16, when fixed to the turning shaft part 7, sandwiches the spacer 36 and the bending springs 37 between itself and the second base member 8, and by causing the bending springs 37 to elastically deform urges the part of the second base member 8 where the abutting part 28 of the second base member 8 is provided about the common centerline 32. The direction of urging of the bending springs 37 is a direction such that the second base member 8 is caused to turn about the common centerline 32 in the direction toward the end of the abutting part 28.

The stopper 17 has a mating hole 39 having a shape complementary to the shape of the fixing part 19 provided on the other end of the turning shaft part 7. By the fixing part 19 being mated with the mating hole 39 and the fixing part 19 then being caulked, the stopper 17 is fixed integrally to the turning shaft part 7 and turns together with the turning shaft part 7. And, the stopper 17 has anti-turning parts 41 that abut with stopping faces 40 provided on the first base member 5, and by the anti-turning parts 41 of the stopper 17 abutting with the stopping faces 40 of the first base member 5, further turning of the turning shaft part 7 with respect to the first base member 5 is limited. By this means, the turning shaft part 7 is constructed so that it can turn through a range of approximately 180° about the axis 6 with respect to the first base member 5.

In the figures, the reference number 42 is a click spring sandwiched between the first base member 5 and the stopper 17, and by this click spring 42 being made to elastically deform between the first base member 5 and the stopper 17, the stopper 17 is urged away from the first base member 5. And, a click projection 43 projecting to the stopper 17 side is provided on the click spring 42, while a recess 44 for engaging with the click projection 43 is provided on the stopper 17. As a result, by the recess 44 being made to engage with the click projection 43 at the ends of the turning range of the turning shaft part 7 with respect to the first base member 5, the free turning of the turning shaft part 7 with respect to the first base member 5 is limited. That is, the rotation of the turning shaft part 7 with respect to the first base member 5 can be temporarily stopped in a predetermined position.

And, in the figure, the reference number 45 denotes a main fixing bracket and the reference number 46 main fixing screws, and by the first member 1 being sandwiched between the fixing flanges 10 provided on the first base member 5 and the main fixing bracket 45 and co-fastened with the main fixing screws 46, the first base member 5 is fixed to the first member 1.

Now, to assemble a hinge device according to this embodiment, with the cutaways 36a, 37a of the spacer 36 and the two bending springs 37 engaged with the support projection 38 of the spring-bearing member 16, the end of the turning shaft part 7 (the end to be engaged with the second member 2) is inserted in turn through the bending springs 37, the spacer 36 and the spring-bearing member 16, and the fixing part 18 on the end of the turning shaft part 7 is caulked to the mating hole 35 of the spring-bearing member 16.

On the other hand, the other end of the turning shaft part 7 (the end to be engaged with the first member 1) is inserted in turn through the second base member 8, the washer 23, the first base member 5, the click spring 42 and the stopper 17, and with the bending springs 37 and the click spring 42 elastically deformed the fixing part 19 of the turning shaft part 7 is caulked to the mating hole 39 of the stopper 17.

By this means the turning shaft part 7 is supported rotatably about the axis 6 in the through hole 9 of the first base member 5, and the second base member 8 is supported on the turning shaft part 7 swingably about the common centerline 32, which is perpendicular to the axis 6.

Then, as shown in FIG. 6, by screws, not shown, being fastened to the second member 2 through the mounting holes 26 formed in the bracket parts 25 of the second base member 8, the second base member 8 is fixed to the second member 2, and by the first member 1 being sandwiched between the fixing flanges 10 of the first base member 5 and the main fixing bracket 45 and co-fastened with the main fixing screws 46, the first base member 5 is fixed to the first member 1. By this means, the first member 1 and the second member 2 are joined together.

Next, the operation of the hinge device of the invention will be explained.

As shown in FIG. 6, the state (this state will be called the closed state) of a first position is shown, in which with respect to the first base member 5 the second base member 8 is disposed at a position of relative angle 0°, that is, the relative angle position of when the first member 1 and the second member 2 are face-to-face with each other over the widest overlap area. At this time, the abutting part 28 of the second base member 8 is received in the drop-in recess 13 provided in the first base member 5.

And, the second base member 8, under the elastic reaction of the bending springs 37, has its abutting part 28 pushed down and received in the drop-in recess 13. Consequently, the bracket parts 25 of the second base member 8 incline so that the abutting part 28 side becomes lower, and because of this the second member 2 can be urged against the first member 1 and in the closed state the two can be held together in firm contact, and looseness can be prevented, and because the abutting part 28 is received in the drop-in recess 13, the second member 2 can be simply prevented from turning with respect to the first member 1. Furthermore, even if there is a certain amount of dimensional dispersion in the first member 1 and the second member 2, looseness between the members 1 and 2 does not arise.

And, by one of the anti-turning parts 41 of the stopper 17 abutting with a stopping face 40 of the first base member 5 and restricting the relative turning in one direction of the two members 1, 2, and the click projection 43 of the click spring 42 being engaged with the recess 44, the members 1, 2 are kept in their closed state until an outside force applied to the members 1, 2 rises above a predetermined size.

Next, an external force turning the second member 2 with respect to the first member 1 about the axis 6 from the closed state is applied. When the external force rises above a predetermined size, the recess 44 of the stopper 17 and the click projection 43 of the click spring 42 disengage, and the abutting part 28 of the second base member 8 moves out of the drop-in recess 13 of the first base member 5 and mounts the cam surface 11. As a result, relative turning of the two members 1, 2 begins.

That is, because the second base member 8 is attached to the turning shaft part 7 swingably about the common centerline 32 of the two pivot shaft plates 31, which is perpendicular to the axis 6 of the turning shaft part 7, it is made to swing so as to allow the abutting part 28 to mount the cam surface 11. Because of this, the second member 2, to which the second base member 8 is fixed, also swings similarly, and moves away from the first member 1 in the thickness direction, and consequently the members 1, 2 are prevented from rubbing together due to the relative turning of the two.

Then, when the second member 2 is turned further with respect to the first member 1, the abutting part 28 of the second base member 8 slides on the sloping cam surface 11 formed on the first base member 5 and is gradually lifted up. At this time, because the abutting part 28 is being urged by the bending springs 37 to press on the cam surface 11 at all times, it is lifted up along the cam surface 11 without moving away from the cam surface 11. When the abutting part 28 is lifted up, the second base member 8 gradually assumes a greater angle of slope against the elastic reaction of the bending springs 37, and in an open state (a second position state), wherein it has been turned through approximately 180° from the closed state, as shown in FIG. 7, the bracket parts 25 of the second base member 8 are made to slope greatly with respect to the first base member 5.

Because the sloping part 34, which slopes with respect to the parallel part 33, is provided on the slider part 24 in the middle of the second base member 8, and the abutting part 28 is disposed roughly on a flat plane including the rear face of the sloping part 34, even when the second base member 8 is turned through approximately 180° about the axis 6 of the turning shaft part 7 with respect to the first base member 5, the friction between the second base member 8 and the first base member 5 is reduced by the sloping part 34.

In this open state, the other anti-turning part 41 of the stopper abuts with the other stopping face 40 of the first base member and further turning of the second base member 8 is limited. And, this open state, the click projection 43 of the click spring 42 ages with the recess 44 of the stopper 17 again and holds the first member 1 and the second member 2 in their open state.

As described above, with this invention it is possible to vide a compact hinge device with which two members can be turned one of the members can be inclined with respect to the other member.

The invention claimed is:

1. A hinge device for hinging a first member and a second member so that, from a face-to-face state, the second member can be turned substantially in parallel with a blocked face to expose the blocked face, said hinge device comprising a first base member fixed to the first member and having a first through hole, a second base member fixed to the second member and having a second through hole, and a turning shaft part engaging with the first and second through holes, said turning shaft part having a turning axis aligned with axes of said first and second through holes, and constructed so that turning the second base member with respect to the first base member rotates the turning shaft part, the turning shaft part is configured to slidingly engage the second base member and turn together with the second base member, the second base member is configured to incline relative to the turning shaft part about a swinging axis that is substantially orthogonal to the turning axis of the turning shaft part, further including an abutting part on the second base member and a sloping cam surface on the first base member, the cam surface extending around the first through hole and cooperating with the abutting part on the second base member, an elastic body disposed with one end fixed to the turning shaft part and an other end pushing the second base member so as to press the abutting part against the cam surface such that when the second base member turns with respect to the first base member, the second base member inclines relative to the turning shaft part as the abutting part slides on the cam surface.

2. A hinge device according to claim 1, characterized in that a recess cooperating with the abutting part is located at a start point of the cam surface to allow the second base member to incline about a direction substantially orthogonal to the turning axis of the turning shaft part.

3. A hinge device according to claim 1, characterized in that the sloping cam surface has a height that gradually increases from a start point toward an end point 4. A hinge device according to claim 1, further including a positioning retaining mechanism for positioning/retaining the turning of the turning shaft part in a predetermined position, said positioning/retaining mechanism establishing at least a first position wherein the second member is substantially face-to-face with the first member and a second position wherein the second member has been turned from the first position through approximately 180° with respect to the first member, about an axis substantially normal with respect to a major surface of the first member, and said second member is connected to the first member in an approximate straight line.

5. A hinge device according to claim 2, characterized in that the sloping cam surface has a height that gradually increases from a start point toward an end point.

6. A hinge device according to claim 2, further including a positioning retaining mechanism for positioning/retaining the turning of the turning shaft part in a predetermined position, said positioning/retaining mechanism establishing at least a first position wherein the second member is substantially face-to-face with the first member and a second position wherein the second member has been turned from the first position through approximately 180° with respect to the first member, about an axis substantially normal with respect to a major surface of the first member, and said second member is connected to the first member in an approximate straight line.

7. A hinge device according to claim 3, further including a positioning retaining mechanism for positioning/retaining the turning of the turning shaft part in a predetermined position, said positioning/retaining mechanism establishing at least a first position wherein the second member is substantially face-to-face with the first member and a second position wherein the second member has been turned from the first position through approximately 180° with respect to the first member, about an axis substantially normal with respect to a major surface of the first member, and said second member is connected to the first member in an approximate straight line.

8. A hinge device according to claim 1, wherein the second base member comprises a substantially flat plate slider part and further wherein the abutting part is formed by a part of the slider part.

9. A hinge device according to claim 8, wherein the abutting part is bent over through about 90° with respect to the flat plate slider part.

10. A hinge device according to claim 8, wherein the abutting part is disposed in a radial direction position equal to a radial dimension of the cam surface of the first base member with respect to the center of the first through hole.

11. A hinge device according to claim 1, wherein the second base member further comprises four projections that are spaced at approximately 90° in a circumferential direction and that project radially inwardly toward the second through hole and further wherein a disc-shaped pivot shaft plate is attached to each of two opposing projections.

12. A hinge device according to claim 11, wherein the turning shaft includes two grooves formed in an outer face of the turning shaft part and further wherein each of the disc-shaped pivot shaft plates has a radial dimension that fits within a respective groove of the turning shaft part.

13. A hinge device according to claim 1, wherein the elastic body comprises at least one bending spring.

14. A hinge device according to claim 4, wherein the positioning retaining mechanism comprises a raised end point positioned on the sloping cam surface.

15. A hinge device according to claim 4, wherein the positioning retaining mechanism comprises a drop-in recess formed in the first base member at a start point of the sloping cam surface and an end point positioned approximately 180° from the drop in recess on a portion of the sloping cam surface.

16. A hinge device according to claim 11, wherein at least one of the inward projections engages at least one groove formed in the turning shaft part to prevent the turning shaft part from turning with respect to the second base member.

17. A hinge device according to claim 1, wherein a start point of the sloping cam surface has a drop-in recess for receiving the abutting part and the sloping cam surface has a continuous, sloping surface from the drop-in recess to an end point.

18. A hinge device according to claim 1 wherein the turning shaft part extends in a longitudinal direction and includes two pairs of grooves formed in the outer circumferential face of the turning shaft part and extending in the longitudinal direction of the turning shaft part, and further wherein ends of one pair of grooves are formed in a semi-circular shape.

19. A hinge device according to claim 1 wherein the second base member inclines relative to the first base member as the abutting part slides on the cam surface.

* * * * *